July 22, 1930.  R. E. CLAPP  1,770,912
RELIEF VALVE
Filed July 23, 1924
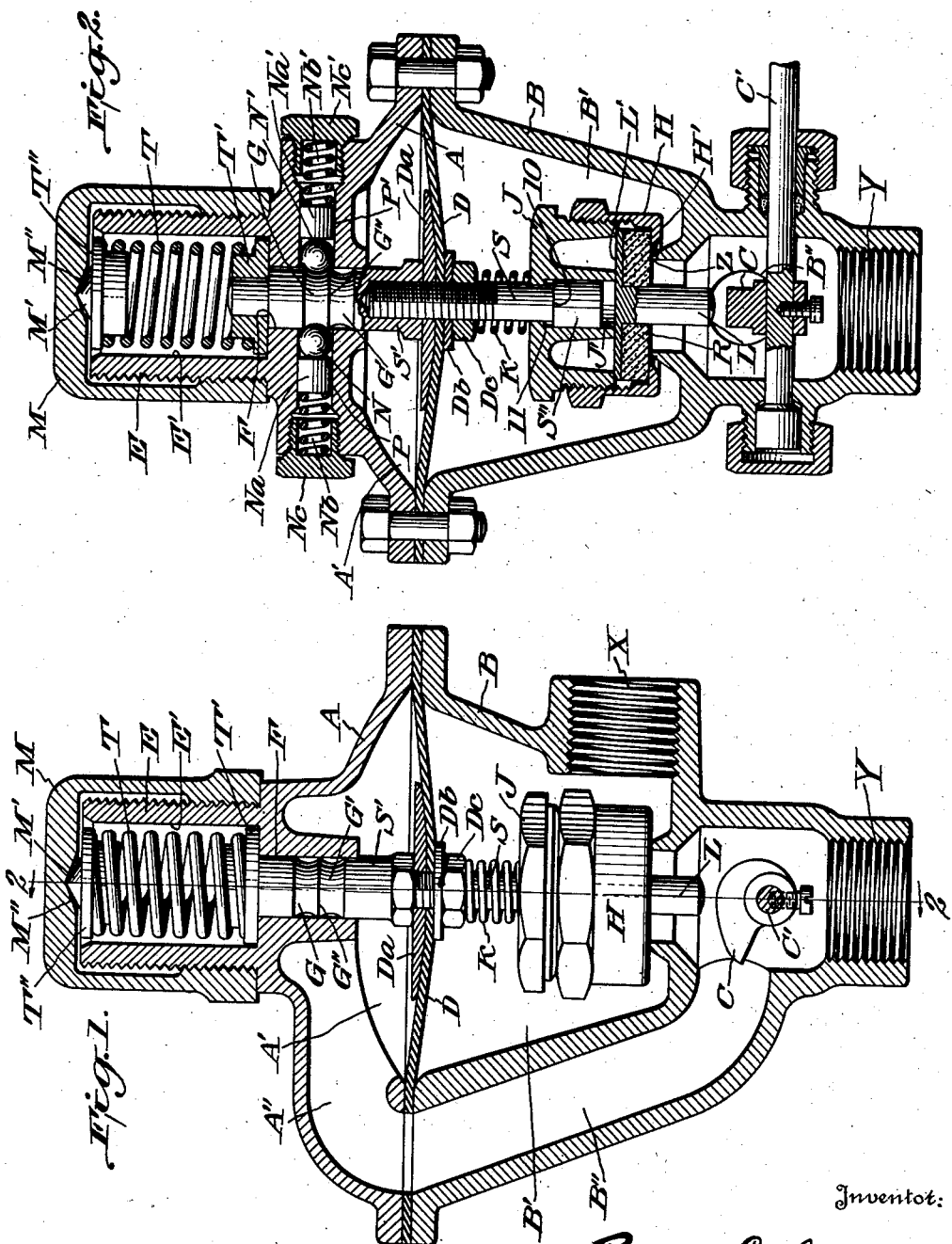

Patented July 22, 1930

1,770,912

UNITED STATES PATENT OFFICE

REVERE E. CLAPP, OF NEWARK, NEW JERSEY, ASSIGNOR TO OXWELD ACETYLENE COMPANY, INC., A CORPORATION OF WEST VIRGINIA

RELIEF VALVE

Application filed July 23, 1924. Serial No. 727,798.

This invention relates to valves and particularly to an improved quick-acting gas-pressure relief valve.

Automatic relief valves, especially diaphragm valves, usually open only slightly at the pressure for which they are set to relieve; consequently, if there is a large gas or fluid volume to be relieved the valve must open wider, which requires a still higher pressure against the diaphragm. Such higher pressures in turn require a corresponding higher or abnormal pressure in the gas or fluid chamber with which the valve is connected, which is objectionable and may even be unsafe. It is therefore extremely desirable that the relief valve shall open suddenly and fully at a predetermined blow-off pressure. A sudden and wide opening valve has the further advantage that it allows a quick and sufficient relief of gas or fluid volume to reduce the pressure to valve-closing pressure before the pressure-producing means has time to accumulate sufficient fluid volume to establish an intermediate pressure which would hold the valve partly open and allow a continual bleeding and loss of gas or fluid and a corresponding continual generation of gas or fluid pressure. It is accordingly also equally desirable that the valve shall close suddenly and tightly after the valve has acted to relieve the excessive pressure.

The principal object of this invention is to provide a relief valve that will open quickly and fully when a predetermined relief pressure is reached; and will also close quickly and tightly after the pressure has been relieved. Another object is to provide a valve in which the fluid pressure assists in holding the valve tightly on its seat when it is closed. A further object is to provide a relief valve that may be manually or otherwise operated without disturbing the automatic or fluid-pressure responsive operating mechanism.

The above and other objects and the novel features of this invention will be apparent from the following description taken with the drawings, in which:

Fig. 1 is a longitudinal sectional view of a relief valve embodying this invention; and Fig. 2 is another longitudinal sectional view of the same, taken along the line 2—2 of Fig. 1.

Broadly speaking, the valve comprises a casing which has an inlet, an outlet, and a seat therebetween for a valve disk that controls the flow of fluid, such as gas, through the casing. The valve disk is so connected to a fluid-pressure responsive device, such as a flexible diaphragm in the casing, that the pressure-responsive member is movable a slight distance independently of the valve disk, being restrained in such movement by an adjustable spring and means such as detents. However, when the relief pressure is reached that movement is exceeded, whereupon the detents are so arranged and the connection between the pressure responsive and the valve disk is such that the valve disk will be suddenly unseated a sufficient distance to quickly and fully open the valve. Accordingly, any minor fluctuations of the fluid pressure just below the relief pressure do not move the valve disk. The detents cooperate with the fluid-pressure responsive means to retain the valve disk in full open position and delay the closing movement of the valve disk until after the abnormal pressure has been relieved. The pressure responsive means and valve disk may move a limited distance without seating the latter, but when such movement is exceeded the detents cooperate with means to accelerate the closing movement to suddenly and tightly seat the valve disk. The connection between the valve disk and its operating means is such that when it is seated the fluid pressure augments the force holding the valve disk on its seat and consequently the valve is so tightly closed that any leakage past the valve seat is avoided. At times it is desirable to operate the relief valve to relieve the pressure or vent gas, as for example, when the valve is mounted upon an acetylene generator that is to be recharged with carbide. For that purpose, manually operable mechanism may be provided for unseating the valve to vent the gas from the generator.

Referring to the drawings, the invention is shown embodied in a gas pressure relief valve adapted for use on acetylene generators in the manner disclosed in an application Serial No. 660,242, filed August 30, 1923, by Laurence Oliphant, but the novel principles may be embodied in other types of valves. The casing desirably consists of two complementary flanged sections A and B, bolted together and clamping between its flanges the marginal portion of the fluid-pressure responsive flexible diaphragm D. The casing section B provides a valve and inlet chamber B' that has an inlet X and an outlet passage or vent Y, and a valve seat Z is provided between such inlet and outlet. The casing section A has a chamber A' that is separated from the chamber B' by the diaphragm D, and is connected by communicating passages A'' and B'' with the outlet or vent Y so that any fluid escaping through a leaky or broken diaphragm D will be vented. For purposes to be described, the casing section A also has an externally-threaded extension E forming a cavity E' that communicates by a guideway F with the chamber A'; and alined other guideways P, P' are provided in the section A perpendicular to the guideway F and opening into the latter.

A valve member or disk R of comparatively soft rubber or other suitable composition cooperates with the valve seat Z to control the flow of gas through the casing from the inlet X to the vent Y. As shown, the valve disk R is annular so as to fit tightly around a lifting pin L and against a plate L' that is formed integral with said pin as the base thereof. The valve disk R and pin L are carried by a suitable holder consisting of two hollow telescoping threaded members or nuts H and J, the member H having an inturned flange H' that engages the face of the disk R near its edge to hold the same against the plate L', which in turn is held against the inner face of the holder J, when the latter is screwed into the nut H.

The valve disk holder is so connected to the diaphragm D that the latter may move a limited distance independently of the valve disk and its holder. As shown, a valve stem is centrally secured to the diaphragm D and consists of a threaded stem member S that screws into a socket in a stem member S' on the other side of the diaphragm. The stem member S' clamps a plate Da against one face of the diaphragm D and a nut Dc on the stem member S clamps a plate Db against the other face of the diaphragm. The valve stem has a head S'' that slidably fits in a cavity J' in the valve disk holder and is of such length that the valve disk may be raised a short distance off its seat without moving the stem assembly and the diaphragm D to which it is connected; and the diaphragm D and stem S may move a short distance independently of the valve disk assembly without unseating the valve. A light spring K surrounding the stem S bears against the diaphragm nut Dc and against the valve disk assembly and normally holds the disk R on its seat while the diaphragm moves slightly due to minor pressure fluctuations in the chamber B'. Gas pressure against the rear side of the seat holder also tends to hold the seat closed more securely as the pressure increases, thereby preventing leakage.

A heavier spring T in the cavity E' has one end bearing against a plate T' on the outer end of the stem member S' and its other end bears against a plate T'' that has a projection M' bearing in a recess M'' of the adjustable cap M threaded on the extension E, whereby the spring pressure may be varied and the operative pressure of the valve may be predetermined. The spring T bears axially against the stem S' and tends to move it and the diaphragm and parts connected thereto to seat the valve disk R.

When the valve is closed, minor fluctuations of the fluid or gas pressure may operate the diaphragm D and stems S, S' for a limited distance against the spring pressure T without raising the valve off the seat Z. The unseating of the valve is delayed by the slidable connection between the holder member J and the stem member S, and the valve is not unseated until the exact predetermined relief pressure is reached, whereupon the shoulder 10 provided by the head S'' engages the end 11 of the cavity J' as the valve stem moves upward, and suitable means cooperate to accelerate the movement of the stem and diaphragm assembly to suddenly and fully open the valve.

Suitable detent means may be provided to cooperate with the valve stem S' to suddenly open and close the valve. As shown, such detent means may consist of two detents having convexly curved faces, such as the balls N, N' disposed in the guideways P, P' and projecting into the guideway F so as to cooperate with similarly shaped recesses, such as circumferential rounded grooves G, G' in the stem S'. The balls N, N' may be pressed inwardly by plungers Na, Na', springs Nb, Nb', and threaded plugs Nc, Nc' in the guideways P, P'. The grooves G, G' have a common edge G'' that is the same diameter as the stem S' and cooperates with the curved faces of the balls to oppose the movement of the stem and diaphragm assembly. But when, for example, the diaphragm is raised so that the edge G'' passes the connecting center line of the balls N, N', the valve stems S, S', with the diaphragm will suddenly move upwardly until the groove G' registers with the balls N, N', where the stem and diaphragm assembly will be held. In the meantime, the shoulder 10 will have engaged the bottom 11 of the cavity J' and unseated the valve disk suddenly to full open position. The curved surfaces of the balls and grooves provide cooperating cam surfaces which accelerate the seating and unseating operation of the valve disk. The valve is retained in the full open position and will not seat in response to minor pressure fluctuations. When the pressure in the chamber B' is reduced to a point where the pressure of spring T minus the friction of the balls overcomes such chamber pressure, the edge G'' passes the center line of the balls and the diaphragm and stem assembly moves to the position where the balls N, N' engage the groove G, releasing the connection between the stem S and valve holder to such an extent that the valve disk R and its holder may suddenly return to reseat the valve disk tightly, the spring K cooperating to effect such seating movement.

The valve disk R may be unseated manually or independently of the fluid-pressure responsive means, as by means of a cam C on a cam shaft C' which is journalled in the casing just above the outlet Y, the cam C being mounted so as to engage the end of the lifting pin L. By turning the shaft C' the cam C may raise the valve disk assembly and unseat the valve disk to vent the pressure line without disturbing the position of the diaphragm and valve stem assembly. After such manual operation and upon return of the cam C to its initial position, the valve disk is automatically reseated by the spring K, and when once seated the valve disk will be held seated by the combined pressure of the spring K and the fluid pressure in the chamber B'.

The operation of the valve will be apparent from the foregoing description. It will thus be seen that a gas-pressure relief valve is provided in which increased gas pressure increases the sealing of the valve; in which the valve opens suddenly and fully when the relief pressure has been reached, and closes suddenly and tightly when the pressure is decreased; and in which the valve may be opened and closed independently of and without disturbing the diaphragm and stem assembly.

While an advantageous type of the improved valve is shown and described in detail, it will be understood that numerous changes may be made in the construction disclosed without departing from the principles of the invention or sacrificing its advantages.

I claim:

1. In a relief valve, the combination of a casing having an inlet and an outlet, fluid-pressure responsive means within said casing and subject to the pressure in said inlet and outlet, a valve member controlling the flow of fluid through said casing and operable by said pressure responsive means, and means cooperating with said responsive means to cause said valve to open suddenly and fully for relieving a predetermined excess pressure and to close suddenly and tightly after relieving such excess pressure.

2. In a relief valve, the combination of a casing having an inlet and a fluid outlet, fluid-pressure responsive means comprising a diaphragm in said casing actuated by fluid admitted through said inlet, a valve member between said inlet and outlet controlling the flow of fluid through said casing and operable by said pressure responsive means, and means including a detent cooperating with said pressure responsive means to cause said valve to open suddenly and fully for relieving a predetermined excess pressure and to close suddenly and tightly after relieving such excess pressure.

3. In a valve, the combination of a casing having an inlet chamber and an outlet, a valve member controlling the flow of fluid from said inlet chamber to said outlet, fluid-pressure responsive means actuated by fluid admitted to said inlet chamber, and means whereby such pressure responsive means has an initial limited movement independently of said valve member and a final accelerated movement during which it operates such member to fully and suddenly open the valve.

4. In a relief valve, the combination of a casing comprising complementary members and having an inlet, an outlet and a seat between such inlet and outlet; and means controlling the flow of fluid from said inlet to said outlet comprising a valve member cooperating with said seat, fluid-pressure responsive means including a diaphragm in said casing between said complementary members and subject to the direct pressure of fluid entering said inlet, and means whereby said pressure responsive means has a limited movement independently of said valve member but operates such member suddenly to fully open the valve when such movement is exceeded.

5. In a valve, the combination of a casing having an inlet and an outlet, a valve member controlling the flow of fluid from said inlet to said outlet, releasable means adapted to retain said member in open position, spring means constantly tending to move said member to closed position, and fluid-pressure responsive means cooperating with said spring means and said releasable means.

6. In a valve, the combination of a casing having a fluid inlet and an outlet, fluid-pressure responsive means actuated by fluid admitted through said inlet, a valve member controlling the flow of fluid from said inlet to said outlet and operable by said pressure-responsive means but loosely connected to the latter and movable independently thereof, and means whereby said valve member may be operated independently of said pressure-responsive means.

7. In a valve, the combination of a casing comprising complementary upper and lower members, said lower member having an inlet and an outlet, fluid-pressure responsive means comprising a diaphragm between said casing members, a valve member controlling the flow of fluid through said casing and operable by said pressure-responsive means, means carried by said upper casing member and cooperating with said pressure-responsive means to cause said valve to open suddenly and fully for relieving pressure and to close suddenly and tightly after relieving such pressure, and means independent of said pressure-responsive means for operating said valve member.

8. In a valve, the combination of a casing having an inlet, an outlet and a seat therebetween, a valve member cooperating with said seat to control the flow of fluid from said inlet to said outlet, fluid-pressure responsive means for operating said member, and manually operable means adapted to move said valve member off its seat without moving said pressure-responsive means.

9. In a relief valve, the combination of a casing having an inlet and an outlet and a seat therebetween, a valve member cooperating with said seat to control the flow of fluid from said inlet to said outlet, fluid-pressure responsive means, means cooperating with such pressure-responsive means to effect a sudden operation of said valve, and cam means for operating said valve member independently of such pressure-responsive operating means.

10. In a valve, the combination of a casing having an inlet, an outlet and a seat therebetween; fluid-pressure responsive means; a valve member cooperating with said seat and operable by said pressure-responsive means; spring means between said pressure-responsive means and said valve member tending to hold said valve member against its seat; and a connection between said valve member and said pressure-responsive means whereby the latter has a limited movement independently of said member, whereby the seating pressure of said valve member increases as the inlet pressure and until such limited movement is exceeded.

11. In a relief valve, the combination of a casing having a fluid inlet, an outlet, and a seat therebetween; fluid-pressure responsive means actuated by fluid admitted to said casing through said inlet; a valve member cooperating with said seat and so connected to such pressure-responsive means that the latter is movable a limited distance independently of said valve member; means opposing the movement of said pressure-responsive means; and means cooperating with such responsive means to accelerate its movement in the same direction after such limited distance is exceeded.

12. In a valve, the combination of a casing having a fluid inlet, an outlet and a seat therebetween; fluid-pressure responsive means actuated by fluid admitted through said inlet; a recessed stem operable by said pressure-responsive means; a valve member cooperating with said seat and operable by said stem; and detent means cooperating with the recessed part of said stem to accelerate the movement of the latter.

13. In a valve, the combination of a casing having an inlet, an outlet and a seat therebetween; a fluid-pressure responsive diaphragm; a recessed stem operable by said diaphragm; a valve member cooperating with said seat; means for so connecting said valve member and said stem that the same may move a limited distance independently of one another; and detent means cooperating with the recessed part of said stem.

14. In a valve, the combination of a casing having an inlet, an outlet and a seat therebetween; fluid-pressure responsive means; a stem operable by such pressure-responsive means and having recesses therein; a valve member cooperating with said seat and operable by said stem; and detent means adapted to engage one of said recesses when said valve member is seated and adapted to engage another of said recesses when said valve member is unseated, said valve and said recesses being disposed adjacent opposite sides of said pressure-responsive means and said detent means cooperating with said recessed stem to accelerate the unseating and the seating of said valve member.

15. In a relief valve, the combination of a casing having an inlet, an outlet, and a seat therebetween, said casing also having guide means; a fluid-pressure responsive diaphragm in said casing; a recessed stem slidable in one of said guide means and operable by said diaphragm; a valve member cooperating with said seat; means for so connecting said valve member and said stem that the same may move a limited distance independently of one another; and spring-pressed convex-faced detent means in other of said guide means cooperating with the recessed part of said stem to accelerate the movement of the latter.

16. In a valve, the combination of a casing having an inlet, an outlet, and a seat therebetween; fluid-pressure responsive means, a stem operable by said pressure-responsive means and having adjoining rounded circumferential grooves; a valve member cooperating with said seat and operable by said pressure-responsive means; and balls cooperating with said grooves to restrain the operation of said stem during part of its movement and to accelerate the operation of said stem during another part of its movement.

17. In a relief valve, the combination of a casing comprising complementary sections providing a chamber, one of said sections having an inlet, an outlet and a seat therebetween, the other section having a main guideway and alined guideways opening into said main guideway; a fluid-pressure responsive diaphragm clamped between said sections; a stem secured to said diaphragm and having a part slidable in said main guideway provided with grooves adapted to register with said alined guideways; a valve member cooperating with said seat; means for so connecting said valve member and said stem that the same may move a limited distance independently of one another; a spring opposing movement of said diaphragm and said stem to unseat said valve; and spring-pressed balls mounted in said alined guideways and cooperating with said grooves to restrain the operation of said stem during portions of its movements and to accelerate the operation of said stem during other portions of its movements.

18. In a valve, the combination of a casing having a fluid inlet, an outlet, and a seat therebetween; a valve cooperating with said seat; means for actuating said valve comprising a fluid-pressure responsive means actuated by the inlet fluid-pressure in one direction, a spring for actuating said fluid-pressure responsive means in the opposite direction, a lost motion connection between said fluid-pressure responsive means and said valve, and a means cooperating with said fluid-pressure responsive means to cause said valve to suddenly open and close in response to a predetermined pressure exerted by the fluid-pressure responsive means.

In testimony whereof, I affix my signature.

REVERE E. CLAPP.